US008418060B2

(12) United States Patent
George et al.

(10) Patent No.: US 8,418,060 B2
(45) Date of Patent: Apr. 9, 2013

(54) METHOD, APPARATUS AND COMPUTER PROGRAM PRODUCT FOR CAPTURING AND VIEWING STORED WEB RESOURCE INTERACTIONS

(75) Inventors: David A. George, Somers, NY (US); Raymond B. Jennings, III, Ossining, NY (US); Malgorzata E. Stys, Purdys, NY (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 12/041,111

(22) Filed: Mar. 3, 2008

(65) Prior Publication Data
US 2009/0222727 A1 Sep. 3, 2009

(51) Int. Cl.
*G06F 3/00* (2006.01)

(52) U.S. Cl.
USPC .......................................... 715/704; 715/861

(58) Field of Classification Search .................. 715/704, 715/861
See application file for complete search history.

(56) References Cited

U.S. PATENT DOCUMENTS

| | | | | |
|---|---|---|---|---|
| 6,826,594 B1 * | 11/2004 | Pettersen | ....................... | 709/203 |
| 6,901,585 B2 * | 5/2005 | Dutta et al. | .................... | 717/143 |
| 7,349,944 B2 * | 3/2008 | Vernon et al. | .................. | 709/204 |
| 2003/0144868 A1 * | 7/2003 | MacIntyre et al. | ................. | 705/1 |
| 2004/0041827 A1 * | 3/2004 | Bischof et al. | ................. | 345/704 |
| 2004/0111488 A1 * | 6/2004 | Allan | ............................. | 709/217 |
| 2007/0198741 A1 * | 8/2007 | Duffy et al. | .................... | 709/245 |
| 2008/0077671 A1 * | 3/2008 | Rust | ............................... | 709/205 |
| 2009/0083676 A1 * | 3/2009 | Flanagan et al. | .............. | 715/853 |
| 2010/0050188 A1 * | 2/2010 | Schellingerhout et al. | ... | 719/318 |

OTHER PUBLICATIONS

"Building Browser Helper Objects with Visual Studio 2005", Schreiner, Tony, et al., Oct. 27, 2006, 11 pgs.

* cited by examiner

*Primary Examiner* — Omar Abdul-Ali
*Assistant Examiner* — Haimei Jiang
(74) *Attorney, Agent, or Firm* — Harrington & Smith

(57) ABSTRACT

Methods, systems and program storage devices receive actions taken by a user during an interaction with a web resource, wherein the actions cause the web resource to assume a particular state; and save information describing the actions. Other methods, systems and program storage devices retrieve the information; and perform at least one action using the information, causing a graphical user interface to display the web resource in a state in accordance with the action. The particular state can include without limitation a plurality of states assumed sequentially when the web resource is displayed, and the information can describe a sequential series of actions that cause the web resource to assume the sequential series of states. In such variants further operations include receiving a series of commands to step through the sequential states of the web resource; and using the information to display the sequential states. The series of commands can be issued automatically or under user control.

20 Claims, 9 Drawing Sheets

PRIOR ART

PRIOR ART

FIG. 3

```xml
<?xml version="1.0" encoding="ISO-8859-1"?>
<URISEQUENCE>
<MILESTONE class="START">
<NAVIGATION sequence=1 type="GET"><URI>http://www.google.com/maps</URI></NAVIGATION>
</MILESTONE>
<FORWARD>
<CLICK type="double" sequence=1 id="/intl/en_us/mapfiles/hpgmm.png" xscale="22%" yscale="63%" button="left"></CLICK>
<DRAG sequence=1 type="left" rect="[+20%, -40%]" id="#mapview" />
<SENDKEYS id="#zipcode" keys="10532" />
<FORWARD>
</URISEQUENCE>
```

301
302
303

METHOD, APPARATUS AND COMPUTER PROGRAM PRODUCT FOR CAPTURING AND VIEWING STORED WEB RESOURCE INTERACTIONS

TECHNICAL FIELD

The invention generally concerns interactions with web browsers and more particularly concerns methods, apparatus and computer program products that capture interactions with a browser by a first person where the interactions generate, for example, a web page in a particular state so that a second person can re-create the web page in that state.

BACKGROUND

Document browsing such as web browsing constitutes a major portion of Internet usage by individuals and user experience with browsers is the basic metric in the choice of web browsers. Over the past decade, a number of web browsers such as Microsoft Internet Explorer, Firefox, Netscape, AOL Explorer etc. emerged with oft-times intense competition for a user audience. Many outstanding features have surfaced, including toolbars, plug-ins, shortcut maintenance and even built-in editing and composing. Most recently, the constructs for Web 2.0 were introduced for maintaining web dialogs that have the responsiveness and appearance of normal "desktop" applications.

A major flaw has emerged with the advent of AJAX via the XMLHttpRequest Object and other direct DOM changes made by scripts. The flaw is that there is no convenient means for the user to capture a particular dynamic content as in prior art by simply copying the present navigation link for the presently shown page. This has failed, too, in the prior art for any stateful interactions one may have when navigating as the session data and local cookies will carry different information.

Furthermore, there exists no means for one user to convey accurately the list of steps for another to follow when instructing how to perform certain tasks with stateful web location, because one may have to navigate a complex maze of choices, including logging into the site. Certain navigation enablement is allowed for example, for navigating to prior pages ("back navigation") and previously visited (in the forward direction) pages ("forward navigation"). Logically, these navigation means can be disabled for use until circumstances permit the "Back" or "Forward" navigation buttons. As is typical of web pages there can exist a plurality of event types in the browser display wherein clicking can instigate a navigation to a URI, or the instantiation of a script that ultimately alters the DOM, which in turn is reflected in the displayed web page.

Thus, those skilled in the art seek methods, apparatus and computer program products that overcome the limitations of the prior art.

SUMMARY OF THE INVENTION

The foregoing and other problems are overcome, and other advantages are realized, in accordance with the following embodiments of the invention.

A first embodiment of the invention is a computer program product comprising a computer readable memory medium tangibly embodying a computer program, the computer program configured to perform operations when executed by digital processing apparatus, the operations comprising: receiving actions taken by a user during an interaction with a web resource, wherein the actions cause the web resource to assume a particular state; and saving information describing the actions taken during the interaction with the web resource.

A second embodiment of the invention is an electronic device comprising: a memory; and apparatus configured to capture actions of a user during an interaction with a web resource, wherein the actions cause the web resource to assume a particular state when displayed in a graphical user interface; and to store information describing the actions in the memory.

A third embodiment of the invention is a computer-implemented method comprising: receiving actions taken by a user during an interaction with a web resource, wherein the interaction occurs through a graphical user interface and where the actions cause the web resource to assume a particular state when displayed in the graphical user interface; and saving information describing the actions taken by the user to a memory device.

A fourth embodiment of the invention is a computer program product comprising a computer readable memory medium tangibly embodying a computer program, the computer program configured to perform operations when executed by digital processing apparatus, the operations comprising: retrieving information describing actions taken by a user during an interaction with a web resource, wherein the actions cause the web resource to assume a particular state when displayed in a graphical user interface; and performing at least one action using the information, causing a graphical user interface to display the web resource in a state in accordance with the action.

A fifth embodiment of the invention is an electronic device comprising: a memory; and apparatus configured to retrieve information describing actions taken by a user during an interaction with a web resource, wherein the actions cause the web resource to assume a particular state when displayed in a graphical user interface; and to perform at least one action using the information, causing a graphical user interface to display the web resource in accordance with the action.

A sixth embodiment of the invention is a method comprising: retrieving information describing actions taken by a user during an interaction with a web resource, wherein the actions cause the web resource to assume a particular state when displayed in a graphical user interface; and performing at least one of the actions using the information, causing a graphical user interface to display the web resource in accordance with the action.

A seventh embodiment of the invention is a computer program product comprising a computer readable memory medium tangibly embodying information describing actions taken during an interaction with a web resource where the actions cause the web resource to assume a particular state, and wherein the information, when retrieved by computer processing apparatus, is configured to allow replay of the actions that cause the web resource to assume the particular state.

In conclusion, the foregoing summary of the embodiments of the invention is exemplary and non-limiting. For example, one of ordinary skill in the art will understand that one or more aspects or steps from one embodiment can be combined with one or more aspects or steps from another embodiment to create a new embodiment within the scope of the present invention. Further, one skilled in the art will appreciate that steps of a method embodiment can be implemented as functions in an apparatus embodiment, and vice versa.

BRIEF DESCRIPTION OF THE DRAWINGS

The foregoing and other aspects of these teachings are made more evident in the following Detailed Description of the Invention, when read in conjunction with the attached Drawing Figures, wherein:

FIG. 3 illustrates a URI sequence (XML) document that is produced when an originator "records" web page interaction in accordance with the invention;

DETAILED DESCRIPTION OF THE INVENTION

In one aspect the present invention comprises a computer program product tangibly embodying software (e.g., a browser plug-in) that, when executed, allows capturing a series of navigation sequences from a stateless navigation point (herein described as a "Milestone") to another other user-interaction-dependent state. Once information describing the navigation has been captured, it can be provided to others for their use. In this manner, a second user may duplicate the navigation steps of a first user. The interactions captured are those specific events provided by a web browser to the DOM (Document Object Model) of a displayed web page. The manner of capture is independent of the particular geometry, scaling, and font sizes that can be localized, thus, resulting in slightly different appearances across individual user experiences. In one embodiment, the invention comprises recording captured interactions in a simple encapsulate URI Sequence (XML) file that contains the interaction steps. The XML file contains everything needed for allowing others to replicate the originator's steps to obtain a particular stateful resultant web page.

Figure 1:
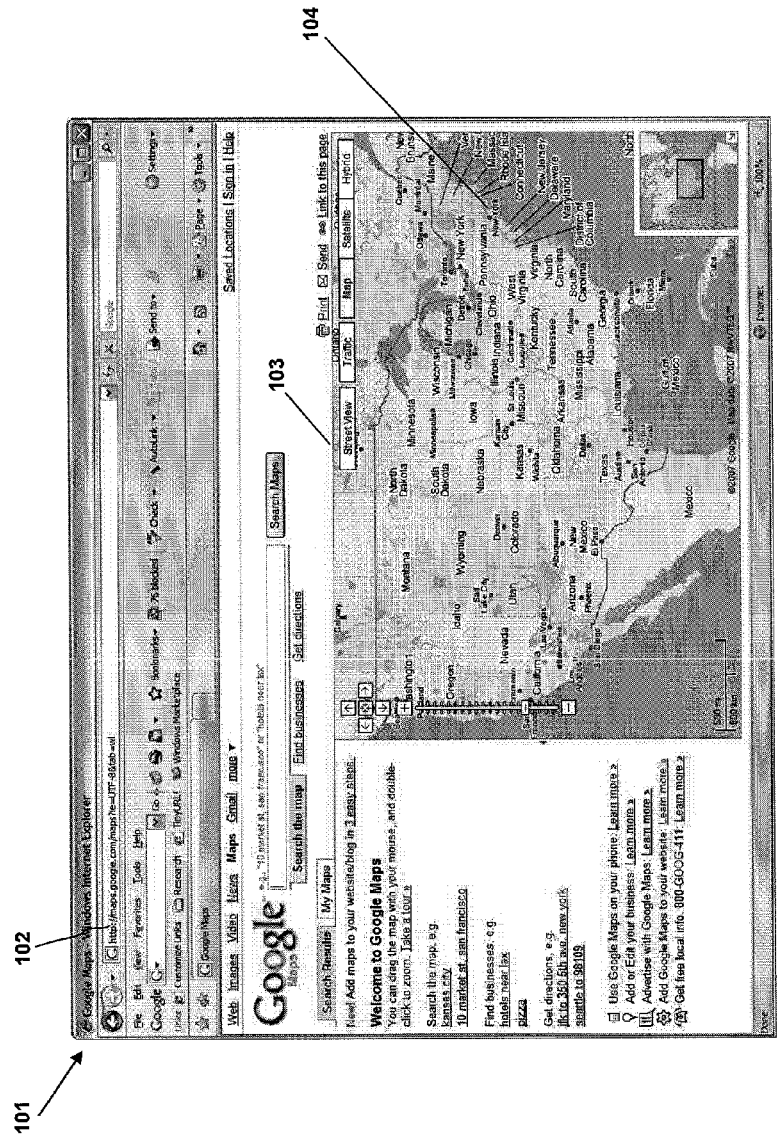
FIG. 1 shows a prior art rendition of a typical browser dialog that provides the selection and display of web content.
Figure 2:
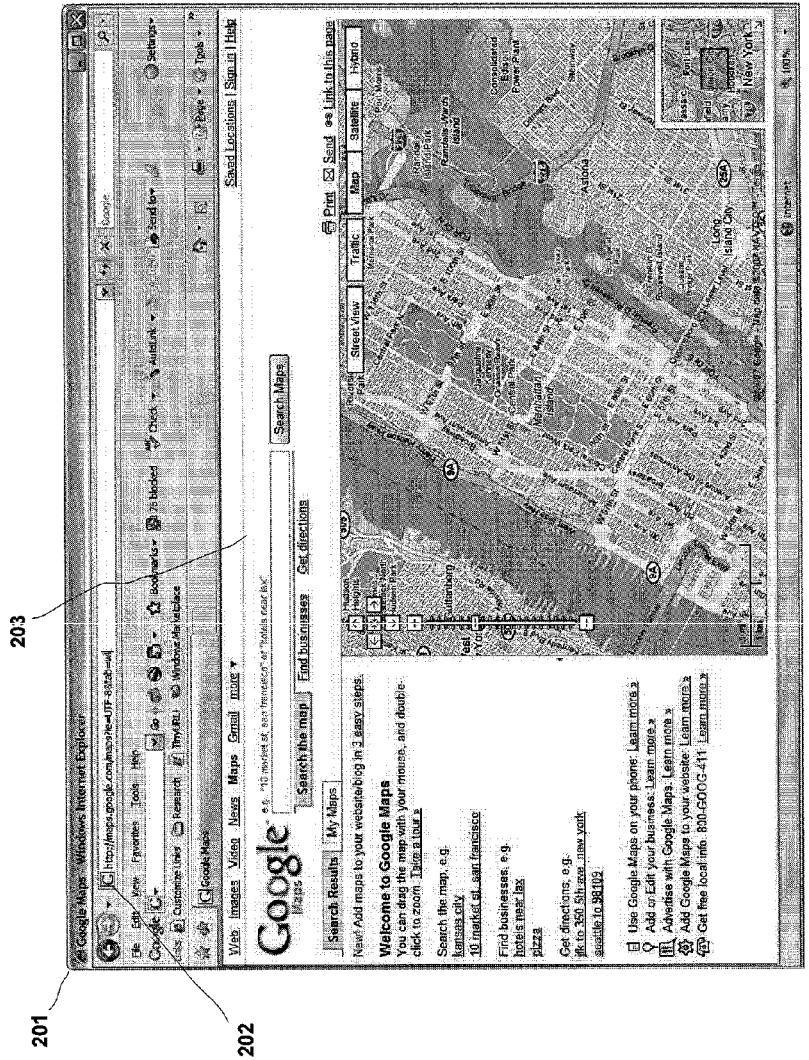
FIG. 2 illustrates a typical browser usage as in the prior art as a consequence of interacting with the page content to move from the original stateless beginning point of FIG. 1 to a stateful resultant page as shown in FIG. 2.

FIGS. 1-2 show web browser pages generated and displayed in accordance with the prior art. In a typical web browser application 201, a user typically selects a target URI (which is commonly displayed in an "address" area 202) to navigate to. The web browser obtains all page content and builds a browser-managed document object model (DOM) that is subsequently used to render the page. Additionally, pages may contain scripts which can be invoked at loading time or as a consequence of user- or browser-initiated events. In FIG. 1, a browser screen 101 shows the result of a navigation to the popular URI http://www.google.com/maps. In this example, the initial navigation 102, done from the locale of NY, USA, the browser shows the lower states of the USA 103. In response to navigation input, the web browser loads a target URI and renders it 103 in a conventional manner. The invention is not limited to the specific protocol or versions of protocols to accomplish this. A method, system and program storage device for browsing hyperlinked documents are provided. A method in one aspect may include enabling navigating from a document having a plurality of hyperlinks to a document associated with one of the plurality of hyperlinks; and enabling navigating directly from the document associated with one of the plurality of hyperlinks to another document associated with another one of the plurality of hyperlinks using one or more of a plurality of defined elements. Systems and program storage devices for performing the above methods are also provided.

FIG. 2 illustrates the prior art as it applies to a common navigation process. The web browser dialog of FIG. 1 101 was clicked repeatedly in the location 104 to reach the appearance shown in FIG. 2. In this prior art example, the AJAX mechanism, using the XMLHttpRequest object, a Web 2.0 technology, allows successive zoom operations that result in the content as shown 203. Despite the user interactions resulting in the appearance of the web browser shown in FIG. 2, the simple URI shown in the navigation address bar 202 still displays the original address associated with the browser appearance depicted in FIG. 2. Consequently, if the user should copy the URI in the address bar and forward the URI to another user, that user would have access to the USA map as it appeared 103 in FIG. 1, and not as it appeared as a result of the manipulations of the originator as depicted in FIG. 2. Herein is a limitation with newer Web 2.0 technology, as stateful navigation results cannot be easily transmitted from one user to another user.

A method and apparatus of an embodiment of the invention allow a user to automatically generate a text file, e.g., comprised of simple XML content, which captures user interaction with a web resource, for example, a web browser. The invention is not limited to storing an encapsulated URI Sequence as a file (e.g., an XML file). It is the convention in the art to refer to it as such, however, the information describing the actions taken during an interaction may exist as a sequence of bytes maintained in a plurality of means including computer memory (RAM) and computer storage. The information may comprise an encapsulated URI Sequence (XML), in one exemplary and non-limiting embodiment of the invention, but the invention is not limited to a particular storage format or storage content. The term "encapsulated" refers to the strict concept that the simplest form of said information is complete in essentials. In variants of the embodiments of the invention, the information may be packaged in an encrypted or non-modifiable form.

Referring to the code depicted in FIG. 3, encoding steps 301 allow for capturing stateless URI(s) or Milestones as a sequence of "steps" or interactions that carry the browser to a stateful web page. At location 302, an event representing a mouse click is recorded. Similarly, 303 records a mouse "drag" event which is represented in a scaled fashion. The description here was chosen to be very literal, i.e., describing explicit user interaction. The invention is not limited to the description of literal or external events in the manner shown. More correctly, the events would be captured as those which occur to identified elements in the DOM, thus, containing a finer detail than that used in this preferred embodiment.

Figure 4:
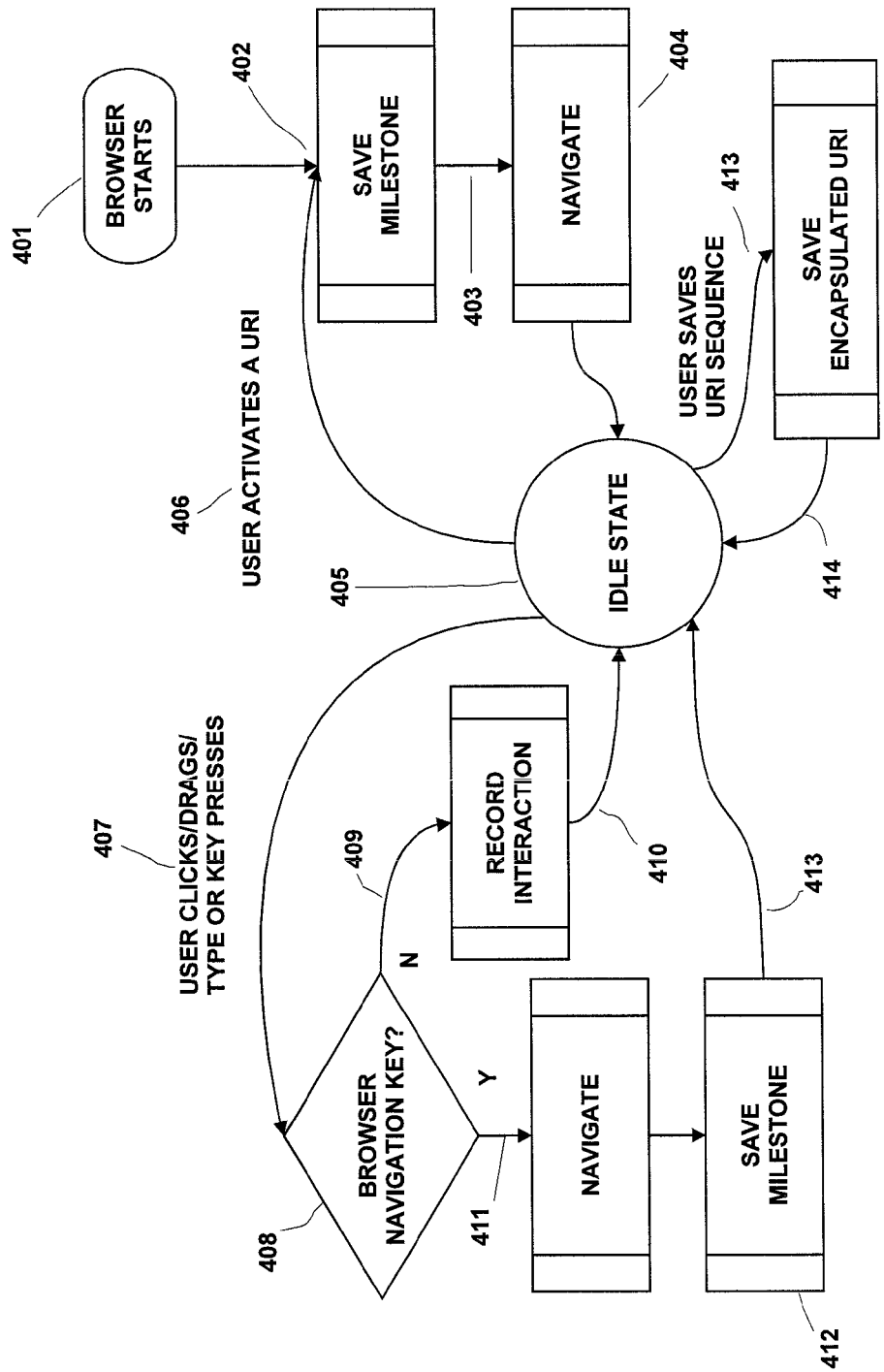
FIG. 4 shows a state transition diagram in accordance with the invention wherein the states that are "stateless" are saved as Milestones and the user interactions are recorded.

FIG. 4 illustrates web browser capture action using a method of an embodiment of the invention. The recording activity begins at 401. Since this start point corresponds to the loading of a supplied URI, the navigation to the first web page loaded is saved as a Milestone 402, prior to actual navigation 403. Once the browser has navigated, thus loading the DOM and rendering, it enters an Idle State 405. If, subsequently a user interaction occurs 408, it is recorded at 409 if it is not a direct navigation, then transitions 410 to the Idle State 405. If it is an interaction causing navigation, the browser performs the navigation 411, saves the new Milestone 412 and then enters at 413 the Idle State 405. At any time, the user may capture an Encapsulated URI (the aforementioned XML file) 413 for further use. Since the browser continues to run, it transitions 414 back to the Idle State 405 to await further interaction.

Figure 5:
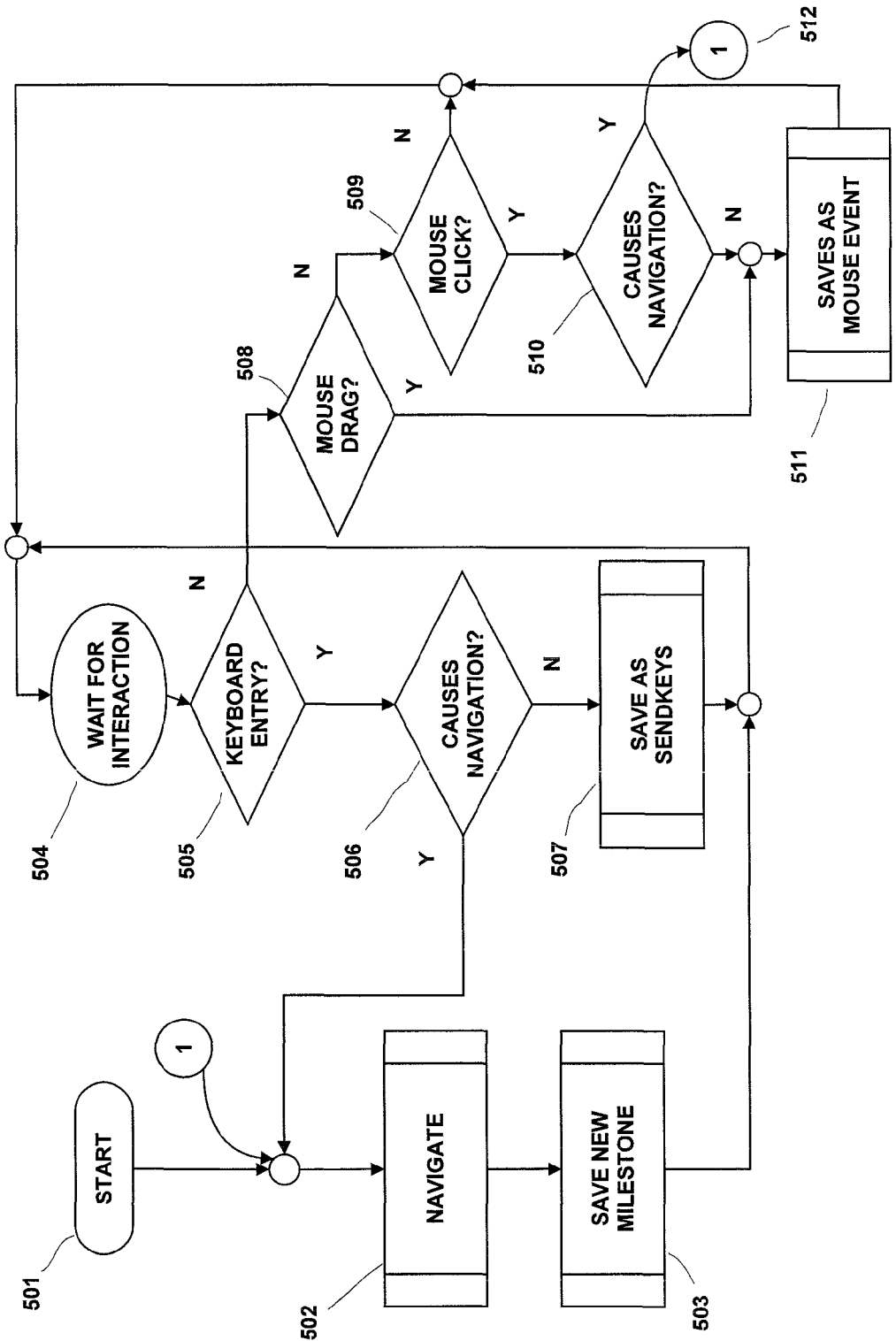
FIG. 5 shows logic enacted by a browser plug-in for the on-going process of capturing user interaction and recording them, one by one, all in accordance with the invention.

FIG. 5 is a flowchart of the processes that occur within the browser and the plug-in to achieve capture of the actions performed by the user. Beginning at 501 the browser navigates at 502 to an initial URI, thus loading the page and performing the routine events appropriate to that navigation and saving the location as a new Milestone 503 (the information represents a stateless page). Next, the browser waits for an interaction event 504 and determines if a keyboard entry 505, whether the keyboard entry causes immediate navigation 506 to a new URI. If so, then navigation occurs at 502 and the process circulates back eventually to waiting for an interaction 504, again. If it is a keyboard action, then the specifiable DOM object and the key entry is captured 507. After saving is done, the process circulates back eventually to waiting for an interaction 504, again. If the interaction was not via keyboard 505, then it is examined for a mouse drag operation 508. If a drag, the mouse event is captured via capture of relative begin to final operation 511 and the process circulates back eventually to waiting for an interaction 504, again. If not a drag operation 508, instead, a mouse click 509, then the mouse event is again recorded with click type and DOM object 511, provided it did not cause navigation 510. If navigation 510 were to occur 512, then as in the start 501, navigation 502 will be performed. As before, given this sequence of events, the process circulates back eventually to waiting for an interaction 504, again. A mouse click can be a non-event, just as perhaps some attempts of a mouse drag when not applicable can occur. These non-consequential events are conveniently discarded 509 causing immediate dispatch to 504 where the browser waits for further interaction. The user can at any time terminate the browser or initiate the URI save 413. These details are omitted from FIG. 5 for clarity.

Figure 6:
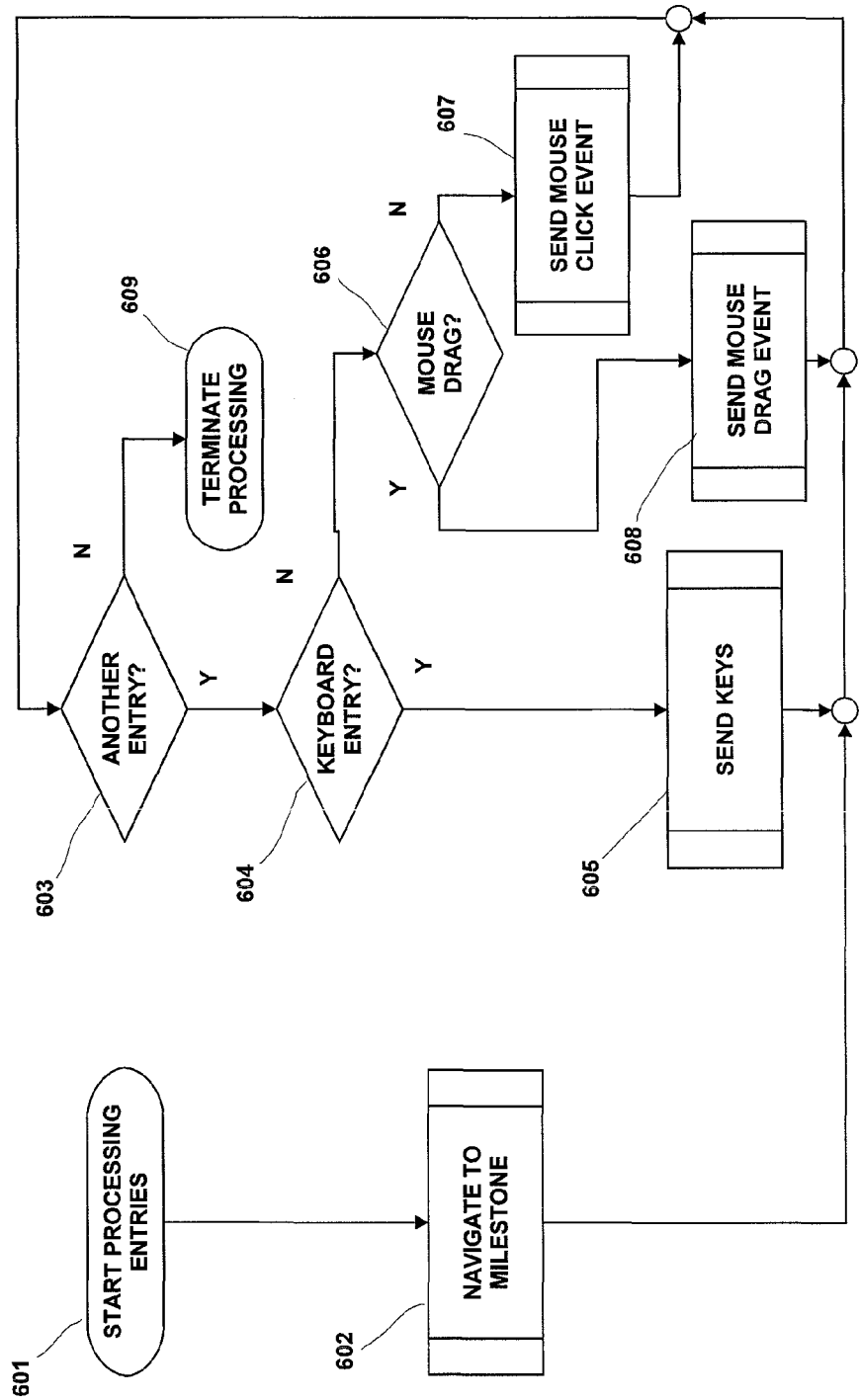
FIG. 6 shows the logic enacted by the playout browser to read, one-by-one, the URI sequence (XML) and progress the browser from the initial state to a final state for the recipient to use, all in accordance with the invention.

FIG. 6 is a flowchart that depicts the essentials of a web browser interpreting the encapsulated URI (XML) file, once initiated by a user. Entries are opened for processing 601 and the browser first navigates to the always present initial Milestone 602. Next, either automatically or under a step-by-step user control, the browser determines if there is a following entry 603. If not, then processing terminates 609. If there is at least one more to process then it is examined for keyboard entry type 604. If so, the keystrokes are sent to the target DOM object 605. Processing then returns to examining for another entry 603 as described above. If not a keyboard entry, then the interaction is processed as a mouse operation. If a mouse drag operation 606, the event is passed to the DOM 608 in a scaled way, allowing for the dimensional differences that exist from originator to the playout. If not a drag 606, the mouse click event is appropriately sent 607 to the designated DOM object. In either case, processing then returns to examining for another entry 603 as described above.

Figure 7:
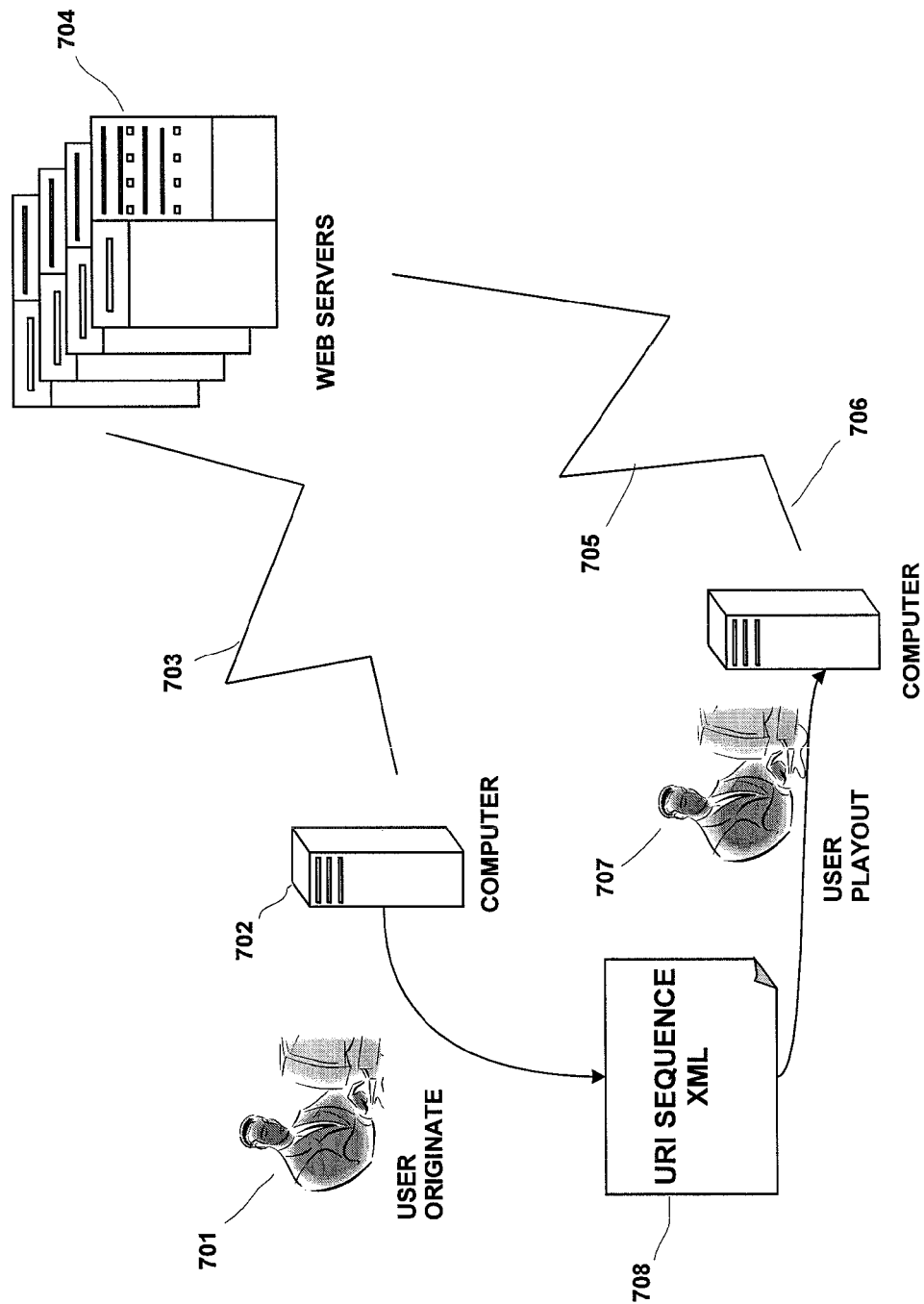
FIG. 7 illustrates the overall view of one user creating an interaction as an encapsulated URI Sequence (XML) and passing it to another who subsequently invokes it to obtain the same final stateful web page that the originator produced.

FIG. 7 depicts the overall succession of events from a high level. A person 701 using a computer 702 connects the browser running therein to at least one web server 704 via a connectivity means 703, such as an internet-capable connection. The user 701 creates the encapsulated URI Sequence (XML) 708 file and conveys it to another user 707. It is possible that the other user is the original user, testing or using the file 708 at a later time. User 707 then loads the encapsulated URI Sequence (XML) file into his/her browser running on his computer 706 and, given similar connectivity to essentially identified servers 704, may successfully invoke the sequences to achieve navigation to an identical or equivalent browser state as intended by the originator 701. The state may be similar, not identical, since navigation may involve user 707 changing text input or reacting to a non-recorded event, such as user login processing. The variances due to security, locale, user identity and user modifications either real time or prior to invoking the encapsulated URI Sequence (XML) file is not essential to the claims of this invention.

Figure 8:
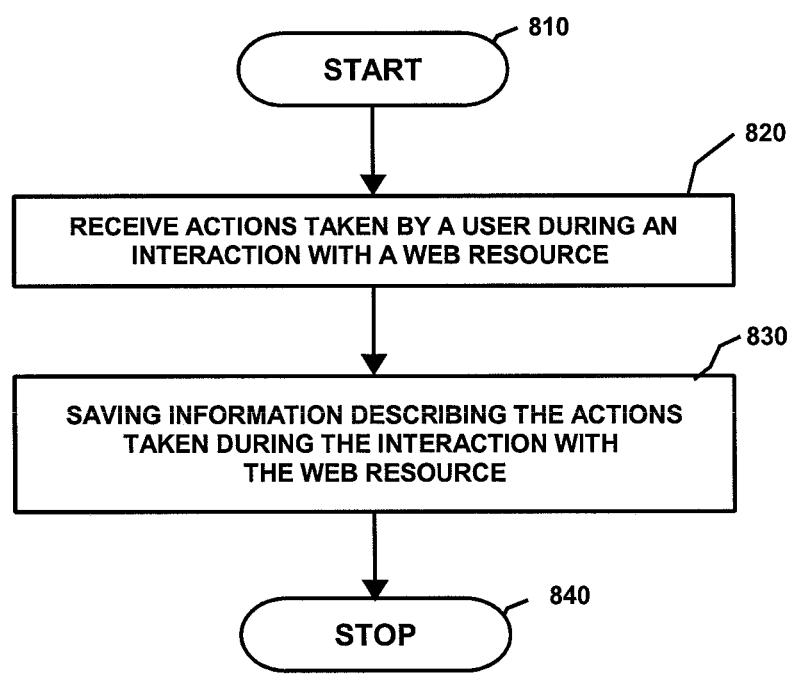
FIG. 8 is a flowchart depicting a method operating in accordance with the invention.
Figure 9:
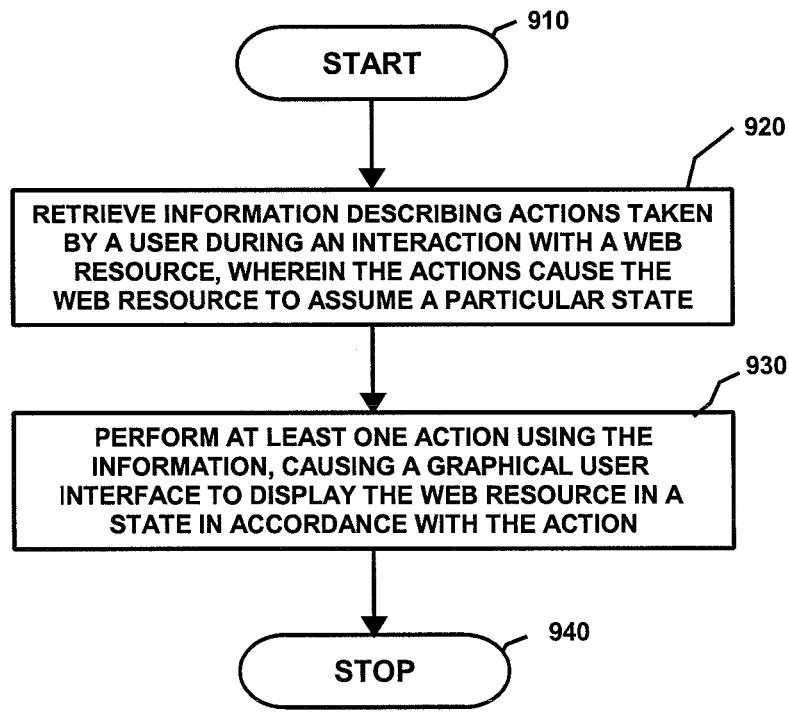
FIG. 9 is a flowchart depicting another method operating in accordance with the invention.

FIGS. 8-9 depict methods in accordance with other embodiments of the invention. FIG. 8 starts at 810. Then, at 820, a computer programmed to perform operations in accordance with methods of the invention receive actions taken by a user during an interaction with a web resource, wherein the actions cause the web resource to assume a particular state. Next, at 830, the computer saves information describing the actions taken during the interaction with the web resource to, for example, a computer memory.

In one variant of the method depicted in FIG. 8, saving information further comprises saving the information as an XML file.

In other variants of the method depicted in FIG. 8, the actions comprise keystrokes. In another variant the actions comprise graphical user interface input pointer input. The actions taken with a graphical user interface pointer input may be taken with at least one of a mouse; a trackball and a touchpad.

In further variants, the graphical user interface input may comprise one of several actions. In a first one of the further variants the action accomplished by the graphical user interface pointer input may comprise movement to a particular portion of the graphical user interface displaying the web resource. In a second one of the further variants the action accomplished by the graphical user interface pointer input may comprise manipulation of a graphical component depicting the web resource. In a third one of the further variants the action accomplished by the graphical user interface pointer input may comprise a rescaling of a graphical component depicting the web resource. In a fourth one of the further variants the action accomplished by the graphical user interface pointer input may comprise a movement of the graphical component depicting the web resource. In a fifth one of the further variants the action accomplished by the graphical user interface pointer input may comprise a click action. In a sixth one of the further variants the action accomplished by the graphical user interface pointer input may comprise a drag-and-drop action.

FIG. 9 starts at 910. Then, at 920 a computer programmed to perform operations in accordance with methods of the invention retrieves information describing actions taken by a user during an interaction with a web resource, wherein the actions cause the web resource to assume a particular state. Next, at 930, the computer performs at least one action using the information, causing a graphical user interface to display the web resource in a state in accordance with the action. The method stops at 940.

In a variant of the embodiment of the method depicted in FIG. 9, the particular state comprises a plurality of states assumed sequentially when the web resource is displayed in the graphical user interface and the information describes a sequential series actions that cause the web resource to assume the sequential series of states that comprise the plurality of states.

In another variant of the method depicted in FIG. 9, the operations further comprise: receiving a series of commands to step through the sequential states of the web resource; and using the information to display the sequential states of the web resource in the graphical user interface.

The present invention is not limited to the specifics of a web browser page layout. For example, there can be tabbed bodies of web pages and other navigational aids which in no way encumbers the mode and application of the present invention. Hyperlinks as referred to herein may comprise text or graphic areas that provide navigation results when activated. The present invention is not dependent on the mode or form of hyperlinks, including those that may be indirectly invoked via the execution of code steps embedded in web pages. The present invention is not dependent on whether one hyperlink is necessarily grouped with other hyperlinks of similar form, hence potentially similar interest. These are aesthetic dependencies and also somewhat determined by the web page author in anticipation for what hyperlinks may be of interest. In the present invention, clicking a hyperlink is identical in concept to activating a hyperlink. The present invention is not dependent on the use of any particular pointer method at the user's disposal. The present invention is not limited to only web content. It applies equally to any hypertext documentation reader, thus applicable to any document containing embedded links that when activated, causes a jump to the corresponding target.

The system and method of the present may be implemented and run on a general-purpose computer or computer system. The computer system may be any type of known or will-be-known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktops, laptops, and servers.

The embodiments described above are illustrative examples and it should not be construed that the present invention is limited to these particular embodiments. Thus, various changes and modifications may be effected by one skilled in the art without departing from the spirit or scope of the invention as defined in the appended claims.

Thus it is seen that the foregoing description has provided by way of exemplary and non-limiting examples a full and informative description of the best apparatus and methods presently contemplated by the inventors for capturing and viewing stored web resource interactions. One skilled in the art will appreciate that the various embodiments described herein can be practiced individually; in combination with one or more other embodiments described herein; or in combination with methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A computer program product comprising a computer readable memory medium tangibly embodying a computer program, the computer program configured to perform operations when executed by digital processing apparatus, the operations comprising:

receiving information relating to a sequence of events undergone by a web resource, the web resource being initially in a stateless condition independent of past or future events undergone by the web resource, wherein the sequence of events comprises events provided to a document object model of the web resource, wherein the sequence of events causes the web resource to achieve a specific stateful condition dependent on a sequence of events undergone by the web resource, and wherein the sequence of events causes the web resource to pass through a sequence of at least two additional stateless conditions independent of past or future events undergone by the web resource, wherein at least two of the additional stateless conditions of the sequence differ from the initial stateless condition and from one another and wherein at least one of the additional stateless conditions carries no information inputted by a user and is restricted from recreating the additional stateless condition;

saving the information relating to the sequence of events causing the web resource to achieve the specific stateful condition, wherein saving the information includes saving information relating to one or more of the additional stateless conditions, including information relating to user interactions bringing the web resource to each of the additional stateless conditions;

wherein saving the information comprises saving information relating to a succession of user actions preceding a first command to save the sequence of events, and wherein saving the information further comprises saving information relating to a further succession of user interactions following the first command and preceding a second command to save the further sequence of events; and wherein saving the information comprises saving the information in encoded form so that, when the information is retrieved and processed by a data processing device, the data processing device is controlled so as to automatically perform actions causing a web resource to pass through the sequence of events, and wherein the actions comprise stopping the sequence to allow a receiver receiving the sequence to input information differing from the information associated with the saved sequence, and recommencing the sequence after entry of the receiver's information, so that the web resource reaches a specific stateful condition based on the saved sequence of events, wherein the specific stateful condition differs from the stateful condition achieved by the originally saved sequence of events.

2. The computer program product of claim 1 wherein saving the information further comprises saving the information as an XML file.

3. The computer program product of claim 1 wherein the events comprise events precipitated by user interactions with the web resource as a user performs actions directing the web resource to the specific stateful condition.

4. The computer program product of claim 1 wherein the actions comprise graphical user interface pointer input.

5. The computer program product of claim 4 wherein the graphical user interface pointer input comprises a movement to a particular portion of the graphical user interface displaying the web resource.

6. The computer program product of claim 4 wherein the graphical user interface pointer input comprises a manipulation of a graphical component depicting the web resource.

7. The computer program product of claim 6 wherein the manipulation comprises a rescaling of the graphical component.

8. The computer program product of claim 6 wherein the manipulation comprises a movement of the graphical component.

9. The computer program product of claim 1 wherein the operations further comprise: retrieving the information relating to the events causing the web resource to achieve the specific stateful condition; and subjecting the initially stateless web resource to the events to which the information relates so that the web resource achieves the specific stateful condition.

10. An electronic device comprising:
a memory; and
apparatus configured to capture a sequence of events undergone by a web resource, the web resource being initially in a stateless condition independent of past or future events undergone by the web resource, wherein the sequence of events comprises events provided to a document object model of the web resource, wherein the sequence of events causes the web resource to achieve a specific stateful condition dependent on a sequence of events undergone by the web resource, and wherein the sequence of events includes passing through a sequence of at least two additional stateless conditions independent of past or future events undergone by the web resource, wherein at least two of the additional stateless conditions of the sequence differ from the initial stateless condition and from one another and wherein at least one of the additional stateless conditions carries no information inputted by a user and is restricted from recreating the additional stateless condition; and
to store information describing the sequence of events in the memory, the stored information including information relating to the additional stateless conditions, including information relating to user interactions bringing the web resource to each of the additional stateless conditions;
wherein saving the information comprises saving information relating to a succession of user actions preceding a first command to save the sequence of events, and wherein saving the information further comprises saving information relating to a further succession of user interactions following the first command and preceding a second command to save the further sequence of events; and
wherein saving the information comprises saving the information in encoded form so that, when the information is retrieved and processed by a data processing device, the data processing device is controlled so as to automatically perform actions causing a web resource to pass through the sequence of events, and wherein the actions comprise stopping the sequence to allow a receiver receiving the sequence to input information differing from the information associated with the saved sequence, and recommencing the sequence after entry of the receiver's information, so that the web resource reaches a specific stateful condition based on the saved sequence of events, wherein the specific stateful condition differs from the stateful condition achieved by the originally saved sequence of events.

11. The electronic device of claim 10 wherein to store information describing the sequence of events in the memory further comprises to store the information as an XML file.

12. The electronic device of claim 10 wherein the information describes a sequential series of user actions that cause the web resource to be subjected to the sequence of events.

13. The electronic device of claim 12 wherein the apparatus is further configured to retrieve the information; to receive a series of commands to step through the sequential states of the web resource; and to use the information to display the sequential states of the web resource in the graphical user interface.

14. A computer-implemented method comprising:
receiving information relating to a sequence of events undergone by a web resource, the web resource being initially in a stateless condition independent of past or future events undergone by the web resource, wherein the sequence of events comprises events provided to a document object model of the web resource, wherein the sequence of events causes the web resource to achieve a specific stateful condition dependent on a sequence of events undergone by the web resource, and wherein the sequence of events causes the web resource to pass through a sequence of at least two additional stateless conditions independent of past or future events undergone by the web resource, wherein at least two of the additional stateless conditions of the sequence differ from the initial stateless condition and from one another and wherein at least one of the additional stateless conditions carries no information inputted by a user and is restricted from recreating the additional stateless condition, the sequence of events causing the web resource to achieve a specific stateful condition comprising a display of information by a graphical user interface and where the actions cause the web resource to assume a particular state when displayed in the graphical user interface; and
saving information to a memory device sufficiently describing the sequence of events undergone by the initially stateless web resource that the specific stateful condition can be replicated through repetition of the sequence of events, wherein saving the information includes saving information relating to one or more of the additional stateless conditions;
wherein saving the information comprises saving information relating to a succession of user actions preceding a first command to save the sequence of events, and wherein saving the information further comprises saving information relating to a further succession of user interactions following the first command and preceding a second command to save the further sequence of events; and
wherein saving the information comprises saving the information in encoded form so that, when the information is retrieved and processed by a data processing device, the data processing device is controlled so as to automatically perform actions causing a web resource to pass through the sequence of events, and wherein the actions comprise stopping the sequence to allow a receiver receiving the sequence to input information differing from the information associated with the saved sequence, and recommencing the sequence after entry of the receiver's information, so that the web resource reaches a specific stateful condition based on the saved sequence of events, wherein the specific stateful condition differs from the stateful condition achieved by the originally saved sequence of events.

15. A computer program product comprising a computer readable memory medium tangibly embodying a computer program, the computer program configured to perform operations when executed by digital processing apparatus, the operations comprising:

retrieving information describing a sequence of events undergone by a web resource, wherein the sequence of events comprises events provided to a document object model of the web resource, wherein the web resource is initially in a stateless condition independent of past or future events undergone by the web resource, wherein the events cause the web resource to assume a particular stateful condition dependent on a sequence of events undergone by the web resource when displayed in a graphical user interface, wherein the sequence of events includes passing through least two additional stateless conditions independent of past or future events undergone by the web resource, wherein at least two of the additional stateless conditions of the sequence differ from the initial stateless condition and from one another and wherein at least one of the additional stateless conditions carries no information inputted by a user and is restricted from recreating the additional stateless condition, wherein the information is encoded so as to control the digital processing apparatus; and wherein the operations further comprise automatically performing a sequence of actions under control of the information to cause the web resource to undergo a sequence of events resulting in particular stateful condition so as to cause a graphical user interface to display the web resource in such a state as to present information representative of the stateful condition, wherein the sequence of events comprises a first succession of events followed by a pause in the sequence to allow a receiver receiving the sequence to input information differing from the information associated with the saved sequence, and a second succession of events following the receiver's information, so that the web resource reaches a particular stateful condition based on the sequence of events described by the retrieved information, wherein the particular stateful condition differs from the stateful condition achieved by the sequence of events described by the retrieved information.

16. The computer program product of claim 15 wherein the particular stateful condition comprises an end state of a plurality of states assumed sequentially when the web resource is displayed in the graphical user interface and the information describes a sequential series of actions that cause the web resource to assume the sequential series of states that comprise the plurality of states.

17. The computer program product of claim 16 wherein the operations further comprise: receiving a series of commands to step through sequential states of the web resource; and using the information to display the sequential states of the web resource in the graphical user interface.

18. The computer program product of claim 1, wherein the events provided to the document object of the web resource comprise events provided by a web browser to the document object model of the web resource.

19. The electronic device of claim 10, wherein the events provided to the document object of the web resource comprise events provided by a web browser to the document object model of the web resource.

20. The computer-implemented method of claim 14, wherein the events provided to the document object of the web resource comprise events provided by a web browser to the document object model of the web resource.

* * * * *